UNITED STATES PATENT OFFICE.

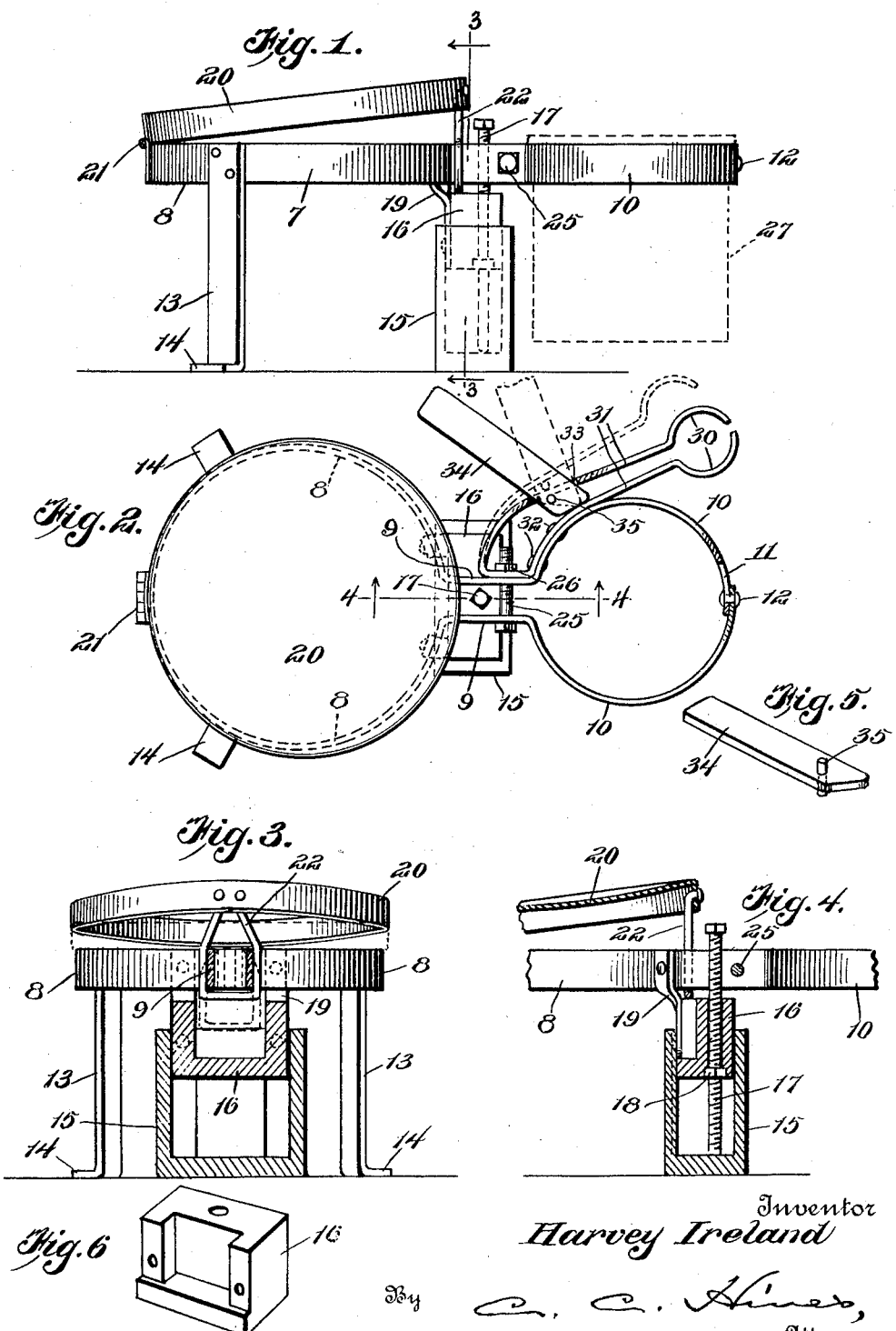

HARVEY IRELAND, OF NORTH EMPORIA, VIRGINIA.

MILKING-STOOL.

1,321,748.  Specification of Letters Patent.  Patented Nov. 11, 1919.

Application filed November 7, 1918. Serial No. 261,491.

*To all whom it may concern:*

Be it known that I, HARVEY IRELAND, a citizen of the United States, residing at North Emporia, in the county of Greensville and State of Virginia, have invented new and useful Improvements in Milking-Stools, of which the following is a specification.

This invention relates to milking stools, and particularly to milking stools of that character which embody means for supporting a milk receiving pail therewith.

The primary object of the invention is to provide a milking stool of improved construction which is equipped with improved means for supporting the pail and holding the same rigid and against movement during the milking operation.

A further object of the invention is to provide a milking stool of the character stated which utilizes the weight of the milker to secure the pail in proper position.

A further object of the invention is to provide a milking stool of the character mentioned which is equipped with improved means for adjusting the stool so that the milk pail may be moved toward or away from the udder of the cow.

A still further object of the invention is to provide improved means for use in connection with a milking stool for holding the tail of the cow during the milking operation.

With these objects in view, together with others which will appear as the description proceeds, the invention resides in the novel construction, combination and arrangement of parts, all as will be described more fully hereinafter, illustrated in the drawing, and particularly pointed out in the claims.

In the drawing:—

Figure 1 is a side elevation of a milking stool constructed in accordance with the invention, Fig. 2 is a top plan view, parts broken away, of the device illustrated in Fig. 1, Fig. 3 is a transverse sectional view taken upon line 3—3 of Fig. 1, Fig. 4 is a detail fragmentary sectional view taken upon line 4—4 of Fig. 2, Fig. 5 is a detail perspective view of the lever for operating the tail holding means, and Fig. 6 is a detail perspective view of one of the sections of the telescopic leg for the milk stool.

The invention consists essentially in a seat for the support of the milker, and associated with the seat is clamping mechanism for holding the pail firmly in position during the milking operation. The seat for the support of the milker is capable of moving, and when the weight of the milker is placed upon the seat the clamping arms for the milking pail will be firmly engaged upon the pail, whereby the latter is held against movement while the seat is so subjected to weight. One of the supporting legs for the stool is of telescopic construction, so that the same may be lengthened or shortened, whereby the pail may be moved toward or away from the udder of the cow.

Associated with the milk stool of this character is improved means for holding the tail of the cow during the milking process, and this means is of such construction as to be rendered readily inoperative, whereby the tail may be released at once when occasion requires.

Referring now more particularly to the drawing, 7 indicates a metallic band bent intermediate its ends so as to provide a circular portion 8, the band near one side of such portion being arranged so as to provide straight, spaced parallel portions 9, the latter being of relatively short duration. That portion of the band beyond the straight portions is bent so as to provide clamping jaws 10, and these clamping jaws may be connected at their outer ends as indicated. In order that the clamping device formed by the jaws 10 may be made larger or smaller, one of the ends of the band is provided with a slot 11, through which extends a pin or rivet 12 carried by the other band end. The portions 9 of the band ends form a restricted neck connecting the circular portion 8 with the clamping element formed by the ends 10 of the band.

The rear portion of the circular member 8 is supported by legs 13 arranged in spaced relation thereon, and these legs may be turned outwardly at their lower ends as at 14 to provide feet. The forward end of the portion 8 is supported by a telescopic or extensible leg formed of the sections 15 and 16. The section 15 is hollow and is designed to rest upon the ground and the section 16 is slidably fitted within the said ground engaging section. These sections are held against inward sliding movement by the threaded stem 17, the latter extending downwardly through section 16 and resting at its lower end upon the bottom portion of section 15. It will be observed that a nut 18 is threaded upon the stem and is seated within a suitable socket or recess in the lower end of section 16, while the upper end of the stem is equipped with a head to permit of a wrench or other stem turning appliance to be attached thereto. The section 16 of the adjustable leg is connected to the forward end of the portion 8 of the stool by strap members 19.

The seat for the milker is indicated at 20, and comprises a metallic plate of substantially the same size and shape as the portion 8, and is hingedly connected to the latter at its rear end as at 21. The forward end of this seat has depending therefrom a loop 22, which incloses the neck portion formed by the parallel parts 9 of the band. It will be observed, and particularly with reference to Fig. 3 of the drawing, that this loop is larger at its lower end than at its connection with the seat, and the arms of this loop converge toward their upper ends. The arrangement is such that when the enlarged portion of the loop is inclosing the neck of the band, which is normally the condition, the clamping jaws 10 are at the limit of their outward movement, and the resiliency of the band ends causes such movement. Should the seat 20 be depressed, the inwardly inclined arm portions of the loop 22 will engage the sides of the portions 9 constituting the neck and will force the same toward each other. This movement of the band ends causes the jaws to move toward each other, and this movement is permitted by the slot and rivet construction 11—12 above described. By reason of the inclination of the arms of the loop 22, the tendency of the portions 9 to move away from each other will cause the forward end of the seat 20 to raise, and the jaws 10 are therefore normally at their outward limit of movement. The degree of this outward movement may be controlled by a bolt 25 connecting the portions 9, and it will be understood that adjustment of the nut 26 upon this bolt may be readily made.

In operation, the stool is placed in proper position beside the cow in such manner that the pail, indicated at 27 will be disposed directly beneath the udder of the cow. Movement of the pail toward or away from the udder may be controlled by turning the threaded stem 17. When the milker sits upon the seat, his weight will cause the said seat at its forward end to move downwardly, whereupon the inclined portions of the loop 22 engage the straight portions 9 constituting the neck, and these elements move toward each other. This movement will cause the jaws 10 to move into firm engagement with the sides of the pail, whereby the latter will be held firmly in position. When it is desired to remove the pail from the holder it is but necessary for the operator to remove his weight from the seat, whereupon the band ends will at once move away from each other causing the pail to be released and the forward end of the seat 20 elevated.

An improved tail holding device is employed in connection with this milking stool, and comprises clamping jaws 30 formed at the ends of a spring band 31, the latter being secured to one side of the clamping device by rivets or screws 32. This tail holding device may also be held in position upon the stool by the bolt 25 which connects the portions 9 of the stool. The free ends of the band are constructed in such manner as to snugly engage around the tail of the cow, and the spring arms formed by the band tend to move toward each other. One of the arms is provided with a slot or elongated opening 33, through which extends one end of an operating lever 34, and the inner end of this lever is inclined as shown and engages with the inner surface of the opposite arm of the tail holder. A pin 35 extends through this lever near its inner end, and prevents the same from becoming disengaged within the opening 33.

It will be observed that the lever 34 is disposed so as to lie close to one leg of the operator when the latter sits astride the stool. Should it be desired to allow the tail to become disengaged from the holder, the leg or knee of the operator may be moved against the lever so as to cause the latter to swing outwardly, whereupon the inner inclined end of the lever riding against the adjacent holder arm will cause pin 35 to engage the opposite arm and force the latter into releasing position. Immediately upon the operator releasing the lever 34, the outer arm of the tail holder will move inwardly, causing the parts to assume the position shown in full lines in Fig. 2 of the drawing.

From the foregoing it is obvious that I have provided a milking stool which may be easily manufactured and which may be readily assembled and put in condition for use. The adjustment of the extensible leg may also be readily made, as can the degree of movement of the clamping jaws 10 be varied. To more comfortably support the user of the stool, the seat 20 is concave as shown in Fig. 4 of the drawing.

While the above is a description of the preferred embodiment of the invention, it will be understood that various changes in the minor details of construction and arrangement of parts may be made without departing from the invention as defined by the claims.

I claim:—

1. In a device of the class described, an elongated frame having integral clamping jaws at one end, a seat hingedly connected to the opposite end of said frame, the said jaws tending normally to move away from each other, and means governed by the downward movement of said seat for causing said jaws to move toward each other.

2. In a device of the class described, a frame comprising a spring band bent upon itself and providing jaws at its ends, the said jaws being normally separated, neck portions connecting said jaws with the major portion of said frame, a seat movably mounted on said frame, a loop carried by said seat and inclosing said neck portions, and the said loop converging toward its point of connection with the seat.

3. In a device of the class described, a frame formed of a spring band bent upon itself to provide a circular portion, jaws at the free ends of said band, the said band providing spaced parallel portions connecting said jaws with said circular portion, a seat movably mounted upon said circular portion, a loop depending from said seat and inclosing said spaced portions, the upper portions of said loops converging toward their point of connection with the seat, one of said jaws having a slot, and a pin carried by the other jaw and extending through said slot.

4. In a device of the class described, a stool having a movable seat, jaws carried by said stool and tending normally to move away from each other, means governed by the movement of said seat in one direction for moving said jaws in the opposite direction, and a bolt loosely connecting said jaws.

5. In a device of the class described, a stool comprising a frame, an extensible leg supporting said frame and comprising slidable sections, a stem extending through one of said sections and engaged with the other section, and means governed by the rotation of said stem for causing said sections to move relative to each other.

6. In a device of the class described, a stool comprising a frame, a telescopic leg supporting said frame and consisting of movable sections, a threaded stem extending through one of said sections and engaged with the other section, and a connection between said stem carrying section and the said frame.

7. In a device of the class described, a stool comprising a frame, an adjustable leg supporting one end of said stool and comprising a hollow base section telescopically receiving an upper section, the said upper section being secured to said frame, and a bolt threaded through and carried by said upper section and engageable at its lower end with the bottom of said base section, whereby the degree of movement of said upper section will be controlled by said bolt.

In testimony whereof I affix my signature.

HARVEY IRELAND.

Copies of this patent may be obtained for five cents each, by addressing the "Commissioner of Patents, Washington, D. C."